United States Patent
Lesner et al.

(10) Patent No.: US 10,608,936 B1
(45) Date of Patent: Mar. 31, 2020

(54) IMPLEMENTING DATA SHARING FEATURES IN LEGACY SOFTWARE APPLICATIONS

(71) Applicant: INTUIT INC., Mountain View, CA (US)

(72) Inventors: Christopher Z. Lesner, Palo Alto, CA (US); Nirmala Ranganathan, San Jose, CA (US)

(73) Assignee: Intuit Inc., Mountain View, CA (US)

(*) Notice: Subject to any disclaimer, the term of this patent is extended or adjusted under 35 U.S.C. 154(b) by 29 days.

(21) Appl. No.: 16/157,031

(22) Filed: Oct. 10, 2018

(51) Int. Cl.
| | | |
|---|---|---|
| *H04L 29/06* | (2006.01) | |
| *H04L 29/08* | (2006.01) | |
| *H04L 12/741* | (2013.01) | |
| *H04L 29/12* | (2006.01) | |

(52) U.S. Cl.
CPC ........ *H04L 45/745* (2013.01); *H04L 61/2092* (2013.01); *H04L 67/32* (2013.01); *H04L 61/6018* (2013.01)

(58) Field of Classification Search
CPC ... H04L 45/745; H04L 67/32; H04L 61/2092; H04L 61/6018; H04L 29/08072; H04L 29/06; H04L 29/0809; H04L 29/08981; G06Q 30/02
See application file for complete search history.

(56) References Cited

U.S. PATENT DOCUMENTS

| | | | | |
|---|---|---|---|---|
| 8,495,163 | B2 * | 7/2013 | Ordille | G06F 17/248 709/209 |
| 9,088,564 | B1 * | 7/2015 | Hobson | H04L 63/083 |
| 2006/0224694 | A1 * | 10/2006 | Lai | G06F 9/44526 709/217 |
| 2014/0040502 | A1 * | 2/2014 | McClenahan | H04L 67/10 709/238 |
| 2014/0266110 | A1 * | 9/2014 | Yuan | H02M 3/156 323/282 |
| 2014/0282086 | A1 * | 9/2014 | Shi | H04L 51/046 715/752 |
| 2016/0373916 | A1 * | 12/2016 | Hakola | H04W 8/005 |
| 2017/0111351 | A1 * | 4/2017 | Grajek | H04W 12/06 |
| 2018/0027070 | A1 * | 1/2018 | Jhanji | H04W 4/08 709/217 |
| 2018/0091355 | A1 * | 3/2018 | Tamura | G06F 16/9574 |
| 2019/0028462 | A1 * | 1/2019 | Ishikawa | H04L 63/0815 |

* cited by examiner

*Primary Examiner* — Abdullahi E Salad
(74) *Attorney, Agent, or Firm* — Patterson + Sheridan, LLP (57) ABSTRACT

Certain aspects of the present disclosure provide a method of establishing a mapping between users of different applications to enable them to use contact information to initiate data exchange with each other.

20 Claims, 6 Drawing Sheets

IMPLEMENTING DATA SHARING FEATURES IN LEGACY SOFTWARE APPLICATIONS

INTRODUCTION

The present disclosure generally relates to computer-based techniques for implementing data sharing features within and between software applications.

Many popular software applications were originally developed before inter-application data sharing features (e.g., social-network features) were the norm. Indeed, many still-popular applications were designed before now-popular social networking platforms existed. Consequently, these software applications do not enable any type data sharing interaction either within the application or between applications, such as provided by social networking platforms. Data sharing features, which may be enabled by social-networking platforms, include, for example, messaging within and between applications, data sharing within and between applications, synchronization of data between applications (e.g., of contact information), and others.

Because software applications lacking social-network functions may lack any shared platform, like FACEBOOK®, GOOGLE+®, LINKEDIN®, and others, functionality may be duplicated in each application. For example, a first software application may have contact management function that stores contact information (e.g., an email address, telephone number, etc.) associated with a particular contact. Similarly, a second software application may also have a contact management function storing some or all of the same contact information fields (e.g., email address, telephone number, etc.). Often, a first user of the first application stores contact information for a second user, and likewise the second user of the second application stores contact information of the first user. However, despite this overlapping information, conventional software applications are unable to create functional links between the first and second user by way of the first and second applications. Moreover, often the contact information in each software application has inconsistencies. This is just one example.

It is impractical to design (or redesign) every software application to interoperate with other software applications, for example offered by other providers, in ways that applications designed with built in data sharing (e.g., social-networking) features can. For example, redesigning an application to include such features may be extremely costly and may irritate or alienate existing users. For many popular applications, millions of user (and their associated revenue streams) are at risk when fundamentally changing the way an application works. Accordingly, methods are needed for creating a link between software applications that allows them to gain data sharing (e.g., social-network-like) functions.

BRIEF SUMMARY

Certain embodiments provide a method of establishing a mapping between users of different applications to enable them to use contact information to initiate data exchange with each other. In one embodiment, the method includes: receiving, from a first user of a first application a request to share data with a second user of a second application, wherein the request includes contact information associated with the second user from the first application; transmitting a token URL to the second user based on the contact information associated with the second user from the first application; in response to activation of the token URL by the second user, identifying the first user to the second application; receiving, from the second user, contact information associated with the first user from the second application; and establishing a mapping in a routing table between the first user of the first application and the second user of the second application based on the first application, the second application, the contact information associated with the second user from the first application, and the contact information associated with the first user from the second application.

Other embodiments provide systems configured to perform methods for establishing a mapping between users of different applications to enable them to use contact information to initiate data exchange with each other, such as the aforementioned method, as well as non-transitory computer-readable mediums comprising instructions that, when executed by a processor of a processing system, cause the processing system to perform methods for establishing a mapping between users of different applications to enable them to use contact information to initiate data exchange with each other.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Methods for establishing a mapping between users of different software applications, as well as computer systems configured to perform the method and computer-program products (e.g., software stored in on a non-transitory computer-readable medium) for use with the computer system are described herein.

The first time a user wants to communicate from within a software application with one of their contacts (i.e., before a first mapping is established between two users of different software applications), a secure-message sequence may be triggered between them. In one embodiment, in response to a request from a first user of a first software application to communicate with the second user of a second software application, a token uniform (or universal) resource locator (URL) is provided to the second user based on the contact information of the second user (which was included in the request). A URL (or "link") is a character string a program uses to connect to a resource, such as a web page or email address. A token URL may include a data token in addition to the URL that a server or service uses to identify a user, a session, or other similar information. Thus, a token URL allows a server or service to deliver more sophisticated and customized information.

In some cases, the initial message exchange to set up a mapping involves out-of-band communication (e.g., external to one or more of the software applications) between a first user and a second user. For example, the token URL may be sent by email to a second user despite the target application of the data sharing request not having an inherent email function. When the second user activates the token URL, for example by clicking on a link in the email, information is provided to the second user identifying the first user to the second software application (used by the second user). Thereafter, the second user may associate contact information in the second application with the first user in order to establish a mapping between the first user of the first software application and the second user of the second software application. This mapping may be stored in a routing table and may allow the first user and the second user to communicate with each other, respectively, from within the first software application and the second software application.

In some implementations, a routing table may be implemented using a separate computer system and/or mapping software application that allows software applications lacking data sharing (e.g., social-network) features to maintain their existing contact information. In this way, the mapping stored in the routing table may enable data sharing features between the applications based on contact information stored in each application, and facilitates interactions among the users of different software applications. In particular, mapping stored in the routing table may allow social-network features (such as a social network of interacting users) to be implemented in (and across the boundaries of) software applications that lack social network features (e.g., "legacy applications").

Using mappings between applications (and their respective users) enables data sharing and social-network features to be integrated in legacy applications that do not have those features by design. For example, a first user of a first software application may interact with and exchange information with a second user of a second software application from within the first software application. Thus, from the first user's perspective, the data sharing and social-network features will appear as though they are integrated into the first software application. This enhanced capability may allow the first users to improve the functionality of the first software application (for example, by harnessing the capabilities of the second software application, as well as its user base), thereby improving the first user's experience when using the first software application—all without a fundamental redesign of the first application. This may lead to increased sales and customer retention for a provider of the first software application.

The contact information and/or records stored within an application are sometimes referred to as "objects." Typically, an object tracked by a software application has some sort of identity (e.g., a data type and a unique identifier number or some set of fields that is unique to the object). The methods described herein may establish mappings from user objects and their contact objects across multiple systems (or software applications) to enable broad interoperability.

The methods for establishing a mapping between applications described herein, such as described below with respect to FIGS. 1-3, may allow determination of a social graph that represents the interactions among the users of different software application. The social graph may form the basis of further features for the software applications that lack such features natively. As one example, resolving differences in contact information across different users and applications is often haphazard, insecure, and typically unsuitable for applications dealing with sensitive information, such as financial software applications. Even when the contact information of a user in two different software applications is the same, this contact information may be user supplied and not verified. Consequently, even apparent agreement may be erroneous. The methods for establishing a mapping between applications described herein can be used to overcome these problems by synchronizing the contact information or records of different software applications using a message-exchange sequence that proves that a particular user is associated with contact information, such as a given email address, telephone number, etc. The mapping between applications allow changes in contact information to be efficiently propagated across a set of software applications.

As another example of a use case for the methods for establishing a mapping between applications described herein, imagine a first user associated with a first business regularly sends invoices to a second user associated with a second business. A conventional method would be for the first user to mail, fax, or email an invoice to the second user, and thereafter the second user would need to manually reenter the invoice information into the second user's own accounting system. Methods described herein enable a significantly improved experience. For example, the first time the second user gets an invoice from the first user, it may contain a special uniform resource locator (URL) that helps the second user pick the software application they use to handle these invoices and within this application to pick the first user's contact record. Once this is done, and a link is established between the users, the invoice information is pulled directly from the first user's application to the second user's application. Consequently, the second user no longer needs to manually enter the invoice information into the accounting system. Further, next time the first user has an invoice for the second user, it is routed directly between the applications involved, which bypasses the need to mail, fax, or email. Further yet, messages between the users can now be routed in a similar fashion. For example when the second user has a question about an invoice item, rather than call, fax, or email, the second user can select the item in question and attach a question directly to the item, which can be communicated back to the first user directly between applications. Notably, this is just one possible use case, and many others are possible.

In the discussion that follows, a "user" may include: an individual or a person (for example, an existing customer, a new customer, a service provider, a vendor, a contractor, etc.), an organization, a business and/or a government agency. Furthermore, a "business" may include: for-profit corporations, non-profit corporations, organizations, groups of individuals, sole proprietorships, government agencies, partnerships, etc. Finally, a financial transaction may involve a product or a service (such as medical care) that is paid for using a type of currency, an asset, and/or by barter. The financial transaction may be conducted by an individual and/or a business.

Figure 1:
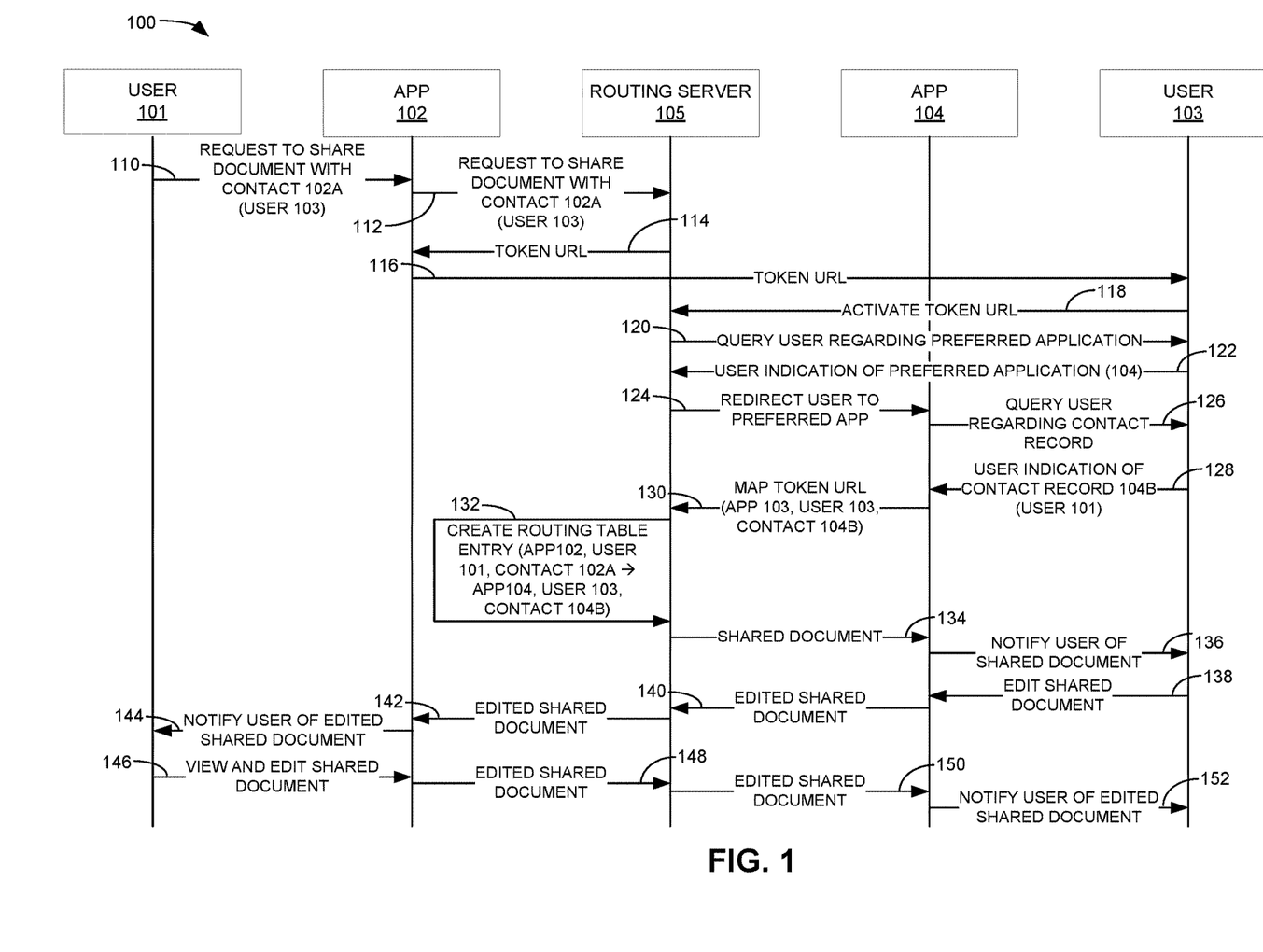
FIG. 1 is an example sequence diagram depicting a method for setting up a mapping between users of different software applications.
Figure 6:
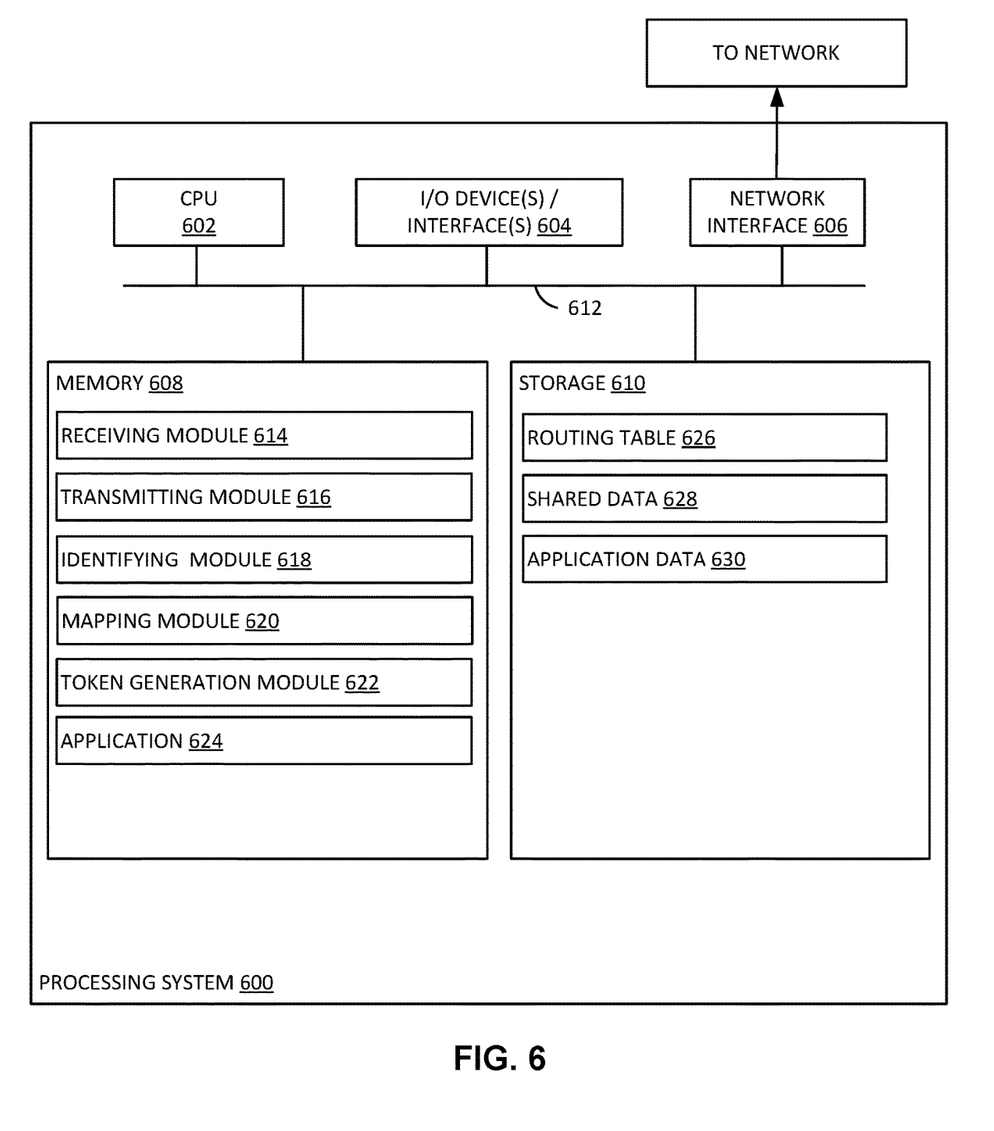
FIG. 6 is a block diagram illustrating an example computer system that may be configured to perform the methods of FIGS. 1-3.

Example Sequence for Establishing a Mapping Between Users of Different Applications FIG. 1 depicts a sequence 100 of steps illustrating one example of a method for creating a mapping between users of two software applications, 101 and 104, which may be performed by a computer system (such as computer system 600 in FIG. 6).

Sequence 100 beings with application 102 receiving a request (operation 110) from a user 101 to share a document using a contact record 102A (within application 102) associated with user 103. In this example, the request identifies application 102, user 101, and contact 102A (corresponding to user 103). In some cases, contact 102A may be identified by verbose contact information, such as stored in the record within application 102, or by a contact ID referencing the contact record. Further, in this example, the request includes the document user 101 intends to share with user 103.

In response to the request, application 102 forwards the request and the shared document to routing server 105 (operation 112). While in this example, application 102 provides the shared document to routing server 105 with the request in operation 112, in other examples the messaging necessary to establish the mapping between the user 101 and user 103 may be separated from the transmission of the shared data (e.g., here, a document).

Because a mapping (e.g., a routing relationship) is not yet setup between user 101 and user 103 in this example, routing server 105 determines that there is no match for the request (identifying application 102, user 101, and contact 102A) in its routing table. Based on this determination, routing server 105 replies (operation 114) with a unique token URL. As above, the token URL may include a URL as well as additional token information, such as information identifying user 101, the session initiated by user 101, etc.

In response to receiving the token URL reply from routing server 105 (operation 114), application 102 forwards the token URL to user 103 (operation 116).

The token URLs can be delivered in a variety of ways, including email, short messaging system, a bar code, QR code, push message, a telephone call with audio transmission, etc. In some examples, the token URL could be appended or added to existing documents or messages (e.g., email), for example by including text such as "click this link" or "scan this barcode to setup electronic data sharing". Where the token URL is delivered by a means not directly between the application, it may be referred to as an "out of band" transmission.

Returning to sequence 100, user 103 receives the token URL and actives it (operation 118). In this case, the token URL includes a link to routing server 105.

In response to activation of the token URL by user 103, routing server 105: (1) notifies user 103 that user 101 sent the token URL; (2) notifies user 103 that the URL pertains to a shared document (in this example); and (3) asks user 103 (operation 120) which application it would like to launch to handle the connection. Thus, the message-exchange sequence in operations 116 and 118 may validate that user 103 is associated with the contact information stored in application 102 and used by user 101.

User 103 then indicates they want to use application 104 (operation 122). Based on user 103's indication, routing server 105 redirects user 103 to application 104 with the token URL (operation 124). In some implementations, before a user can activate a link, they may first be authenticated by their software application to prove that they own a given identity. So here, if user 103 is not already signed in to application 104, user 103 may be optionally asked to first sign or create a new account with associated with application 104 by supplying user credentials, such as a user ID, password, and possibly additional information (e.g., security questions, profile data, etc.). In this example, application 104 is a web-based application, but in other examples, application 104 may be a desktop application that does not require a login or account.

If application 104 tracks contact information, application 104 asks user 103 to identify an existing (or create a new) contact record associated with user 101 (operation 126). If Application 104 does not track contact information, then after operation 124, application 104 may notify routing server 105 that the token URL maps to (application 104, user 103, <blank>), where in this example <blank> indicates that application 104 does not track contact records. In such a case, operations 126 and 128 may be skipped.

In this example, user 103 indicates to application 104 that an existing contact record (104B) exists for user 101 (operation 128). In response, application 104 notifies routing server 105 that the token URL maps to application 104, user 103, and contact record 104B (operation 130).

Figure 4:
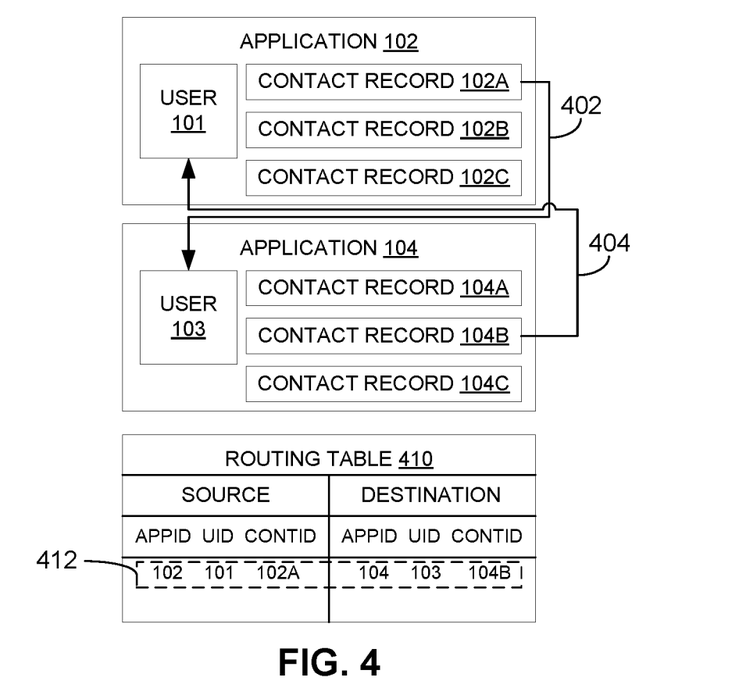
FIG. 4 depicts an example of routing table mapping between two applications.

Based on the notification from application 104, routing server 105 creates a mapping in the form of a routing table entry (operation 132) associating (application 102, user 101, contact 102A) and (application 104, user 103, contact 104B) (as further depicted in FIG. 4 in row 412).

The mapping between applications 102 to 104 may allow the application to interact in ways they were previously unable, such as to make application-programming-interface (API) calls based on the contact information shared between the applications. Because the message interchange format is standardized, the software application on one side of the connection (e.g., application 102) may not need to know anything about the software application on the other side of the connection (application 104). Thus, the capabilities of each software application are enhanced via the mapping (routing table entry) without having to redevelop the individual applications.

After creating the routing table entry, routing server 105 notifies application 104 of a shared document for user 103 and provides the shared document to application 104 (operation 134). In response, application 104 notifies user 103 about the shared document (operation 136) so that the user may interact with the shared document, such as by viewing and editing the shared document.

In this example, user 103 views and edits the document (operation 138). In response, application 104 notifies routing server 105 of the modification to the shared document and provides the edited document to routing server 105 (operation 140). In response, routing server 105 references the mapping (routing table entry created in operation 132). When routing server 105 identifies the appropriate mapping, it notifies application 102 of the edited shared document and provides the edited shared document to application 102 (operation 142). In response, application 102 notifies user 101 of the edited shared document (operation 144).

In this example, user 101 then views and further edits the shared document (operation 146). Notably, in other examples, user 101 may only view the shared document. After user 101 edits the document (operation 146), application 102 notifies routing server 105 of the modification and provides the edited shared document back to routing server 105 (operation 148). Routing server 105 then references the mapping (routing table entry created in operation 132) and determines to notify application 104 of the edited shared document and provide the edited shared document to app 104 (operation 150). In response, application 104 notifies user 103 of the edited shared document (operation 152) in order that user 103 has a chance to view and optionally edit the shared document.

Notably, in this example, user 101 need not know which software application that user 103 uses when requesting to share the document. It is up to user 403 to select the application after they activate the token URL. This creates a very flexible sharing environment because data can be shared without having matching applications on both ends (which may be impractical when working between organizations having their own software implementations).

Thus, the mapping between applications (in this example performed by routing server 105) enables data sharing functions like those enabled by social-network platforms, such as the ability to share messages and data between applications 102 and 104 despite those applications not having that native capability. The mapping thus extends the capabilities of the legacy applications by enabling them to interact with other applications without a ground-up redesign.

FIG. 1 depicts just one example of a sequence wherein the exchange of data (in this example a document and messages related to that document) is handled via routing server 105. This configuration may be particularly useful where one or more of applications 102 and 104 are not always online because the data will be ready and waiting at routing server 105 whenever either application comes online. In other examples, the exchange of data may be handled directly between applications (e.g., between application 101 and 104) or through another intermediary, such as a cloud storage platform, after the routing data between the applications is established.

Further, while not shown in sequence 100, the mapping between the contact information associated with users 101 and 103 in applications 102 and 104 may be used to synchronize contact information between the applications, such as by a data exchange similar to the document exchange described in this example.

Figure 2:
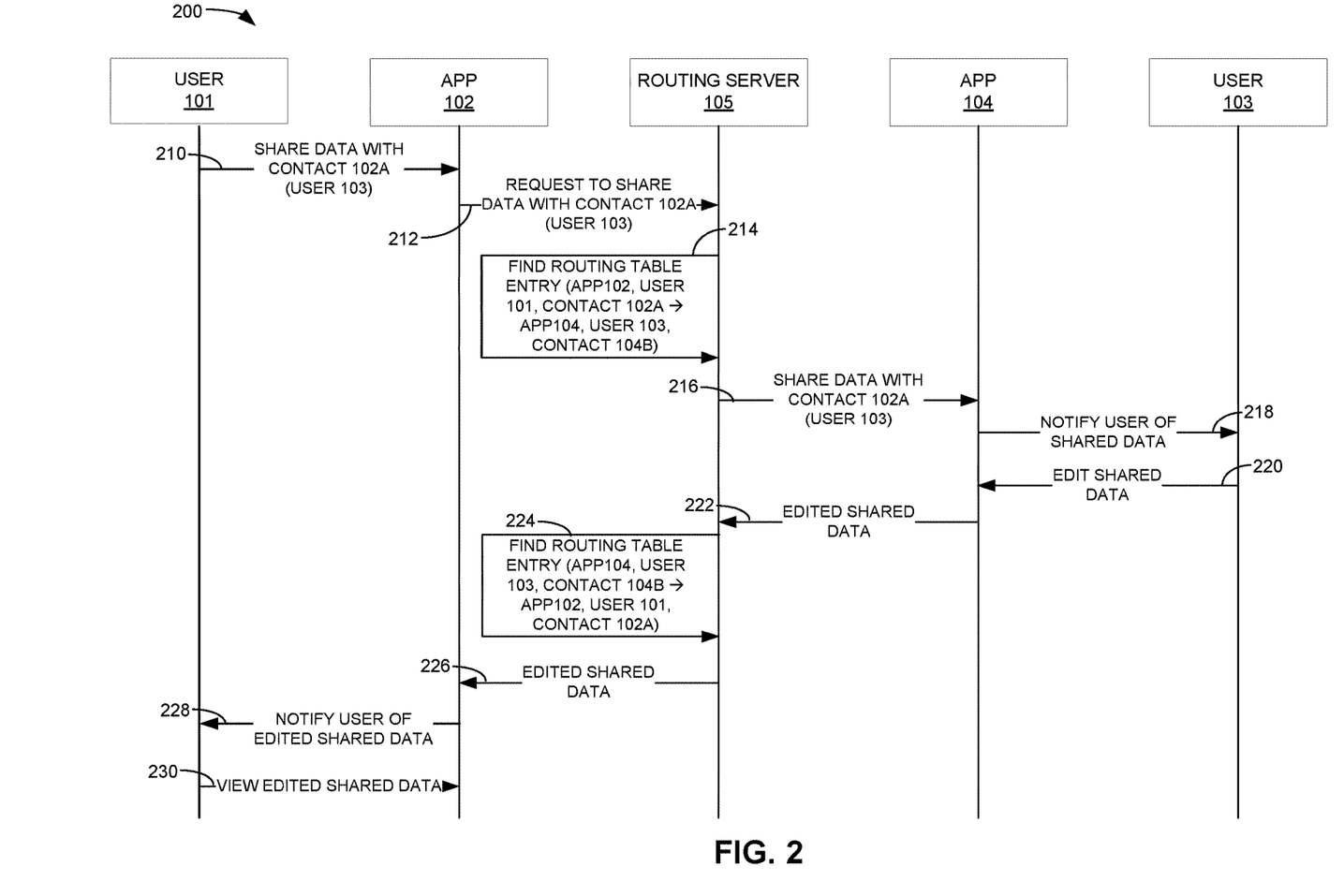
FIG. 2 is an example sequence diagram depicting a method for using a mapping between users of different software applications.

Example Sequence Using a Mapping Between Applications Based on Contact Information FIG. 2 depicts a sequence 200 illustrating an example of how an established mapping between users of different software applications can be used to share data.

Sequence 200 begins when application 102 receives a request from user 101 to share data with user 103 associated with contact record 102A (operation 210). In this example, the data can be, for example, application data, such as documents, raw data, electronic files in an application specific format, message data, contact information, and other types of data.

Application 102 forward the request and data to routing server 105 (operation 212). Routing server 105 then queries a routing table and finds a mapping (routing table entry) associating {application 102, user 101, contact 102A} with {application 104, user 103, contact 104B} (operation 214). Based on the mapping, routing server 105 forwards the request and data to application 104 (operation 216).

Upon receiving the request and shared data, application 104 notifies user 103 of the shared data (operation 218). In response, user 103 can now view and optionally edit the shared data.

In this example, user 103 edits the shared data (operation 220), which causes application 104 to send routing server 105 a notification and the edited shared data (operation 222). Routing server 105 queries the routing table and finds the mapping (routing table entry) associating {application 104, user 103, contact 104B} with {application 102, user 101, contact 102A} (operation 224). Based on the routing table entry, routing server 105 sends a notification and the edited shared data to application 102 (operation 226). Application 104 then notifies user 101 of the edited shared data (operation 230). Thereafter, user 103 views the edited shared data (operation 130).

As one example, the shared data may be a contact record stored in application 102 that is associated with user 103. When the contact data is shared with user 103 by the process described in sequence 200, user 103 may edit the contact record and share the updated contact data back with user 101. In this way, the contact information may be synchronized between application 102 and 104, despite there being no inherent ability for applications 102 and 104 to share that type of data.

As another example, imagine that the shared data was a bid for services between user 101 and 103. Each user may be using its own application for tracking bids, contracts, invoices, etc. However, user 101 is able to send a first proposal generated in application 102 (the shared data in this example) to user 103, and user 103 is able to edit that first proposal in its own application 104 and send that back to user 101. User 101 may accept that edited proposal and save it in application 102 for further processing or tracking. Thus, applications not originally designed to share specific types of application data are now enabled to share that application data without redesign.

As with FIG. 1, in this example routing server 105 acts as an intermediary for the requests and the shared data. However, in other examples routing server 105 may only intermediate requests between applications 102 and 104, and the data may be shared directly between the applications. The configuration of the data sharing is flexible once the routing table entry is established between the two users and their associated applications. Further, in some embodiments the functionality of routing server 105 may be a part of one or more of the applications, such as application 102 or application 104. Further, in some implementations, application 102 and application 104 may be the same application with user 101 and user 103 having different user accounts for that application. In some cases, the user accounts may be tied to different versions or capability levels of the application.

Modifications to the shared data by user 101 and user 103 (e.g., edits to a shared document) may be interleaved in an arbitrary order. In one implementation, conflicting changes are prevented by allowing only changes to be appended. In another implementation, conflicting modifications to the shared data (e.g., to a shared document) are rejected, and an indication may be sent to each user indicating the rejection. In yet another implementation, operational transforms are used to maintain consistency and concurrency control in collaborative use of the shared data.

In some examples, sequence 200 is implemented using one or more electronic devices (such as a computer or a portable electronic device, such as a cellular telephone, smartphone, tablet computer, wearable device, and the like) and one or more computers (such as a server or a computer system), which communicate through a network, such as wide area network (WAN), local area network (LAN), a cellular data network, the Internet, etc.

In some embodiments polling (for example triggered by web browser refresh) may replace some or all of the notifications described above with respect to FIGS. 1 and 2.

Figure 3:
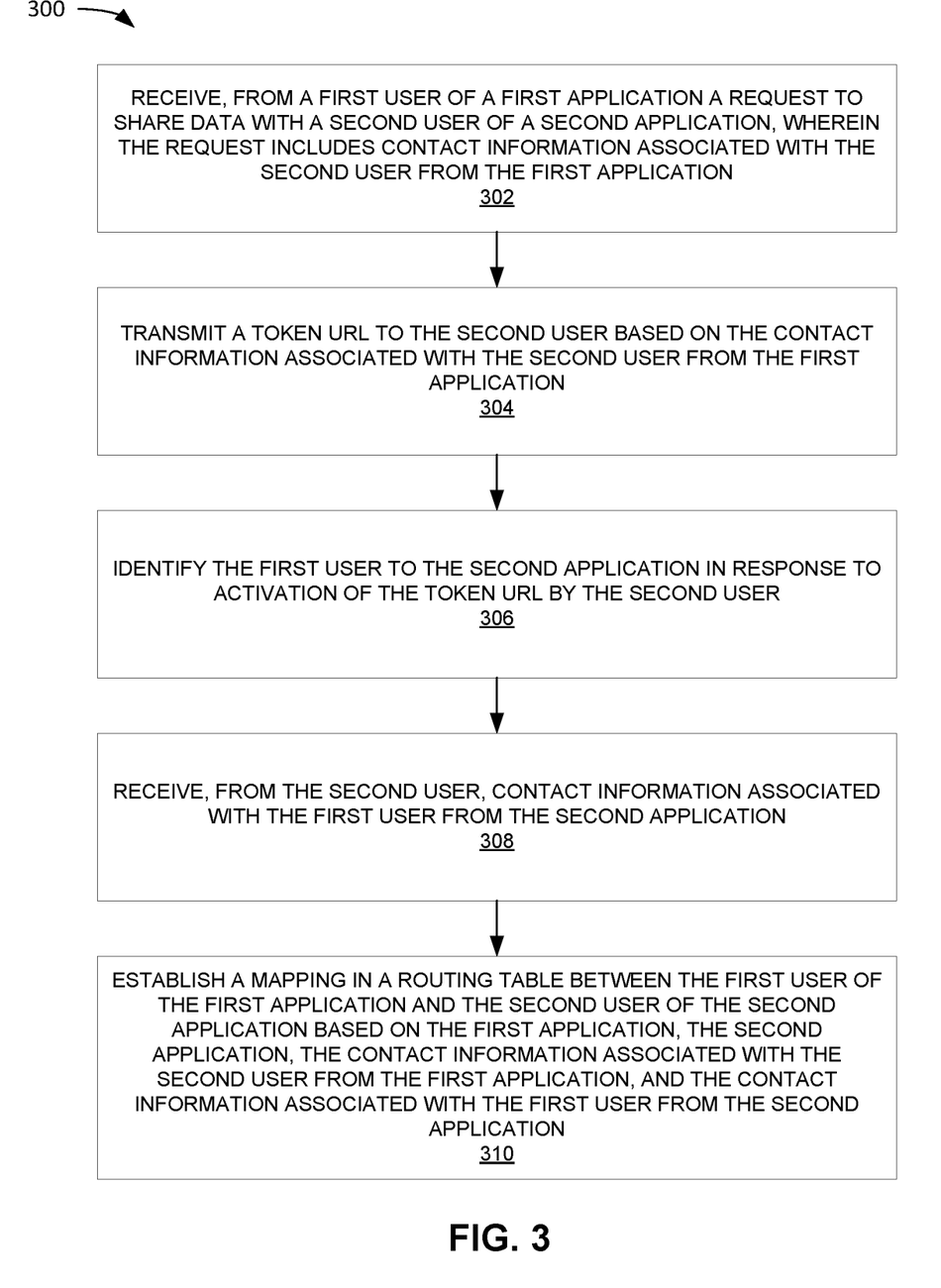
FIG. 3 depicts an example of a method for establishing a mapping between users of different applications to enable them to use contact information to initiate data exchange with each other.

Example Method for Establishing a Mapping Between Users of Different Applications FIG. 3 depicts a method 300 for establishing a mapping between users of different applications. Method 300 enables users to initiate data exchange with each other based on stored contact information within the applications.

Method 300 begins at step 302 with receiving, from a first user of a first application a request to share data with a second user of a second application, wherein the request includes contact information associated with the second user from the first application. As described above, the data can be any sort of data, including electronic files (e.g., documents), application specific data, raw data, or the like.

In some examples, the contact information associated with each user is a contact ID, which identifies a contact record in an application uniquely.

Method 300 then proceeds to step 304 with transmitting a token URL to the second user based on the contact information associated with the second user from the first application. As described above, the token URL may include a link to a remote resource, such as the routing server described above with respect to FIGS. 1 and 2. Further, the token URL may include a token identifying, for example, the first user and/or identifying the session being initiated by the first user.

In some implementations, the token URL is transmitted via a communication connection external to the first application and the second application. For example, the communication connection may be by way of email message, short message service (SMS) message, a bar code, QR code, push message, a telephone call with audio transmission, and other communication channels not provided directly by either the first application or the second application.

Though not shown in FIG. 3, method 300 may further include generating the token URL after receiving the request. The token URL may include a URL identifying a remote resource (e.g., remote server 105 in FIGS. 1 and 2) and include token information, for example, identifying the first user and/or a session initiated by the first user.

Method 300 then proceeds to step 306 with identifying the first user to the second application in response to activation of the token URL by the second user.

Method 300 then proceeds to step 308 with receiving, from the second user, contact information associated with the first user from the second application. As above, in some examples, the contact is or includes a contact ID associated with a contact record for the first user stored in the second application.

Method 300 then proceeds to step 308 with establishing a mapping in a routing table between the first user of the first application and the second user of the second application based on the first application, the second application, the contact information associated with the second user from the first application, and the contact information associated with the first user from the second application.

In some implementations, the mapping includes: a first user identifier associated with the first user; a first identifier associated with the first application; the contact information associated with the second user from the first application; a second user identifier associated with the second user; a second identifier of the second application; and the contact information associated with the first user from the second application. For example, FIG. 4 above depicts an example of a mapping (row entry 412).

Though not depicted in FIG. 3, in some implementations, method 300 further includes using the mapping in the routing table to enable the first user of the first application to share data with the second user of the second application. For example, users may share and collaborate with data in the manner described with respect to FIGS. 1 and 2.

Method 300 may further include receiving, from the first application associated with the first user, data to share with the second user; finding the mapping in the routing table between the first user of the first application and the second user of the second application; and transmitting the data to share to the second application. For example, FIGS. 1 and 2 above describe a first user sharing data with a second user via a routing server.

Method 300 may further include receiving, from the second application associated with the second user, modified data to share with the first user; finding the mapping in the routing table between the first user of the first application and the second user of the second application; and transmitting the modified data to the first application. For example, FIGS. 1 and 2 above describe a second user sharing modified data with a first user via a routing server.

Example Routing Table

FIG. 4 depicts an example of a routing table 410. In this example, routing table 410 includes a mapping (routing table entry) 412 such as would be created after the sequence illustrated in FIG. 1.

In this example, and as described above, user 101 of application 102 has a contact record 102A associated with user 103, and user 103 of application 104 has a contact record 104B associated with user 101. After the sequence illustrated in FIG. 1, a forward link 402 and reverse link 404 are established between users 101 and 103 via the mapping (routing table entry) 412 in routing table 410. The sequence illustrated in FIG. 2 uses mapping 412.

In this example, mapping 412 reflects the details of forward link 402 and reverse link 404, and identifies an application ID ("APPID") for each application (102 and 104 in this example), user ID ("UID") for each user (101 and 103 in this example), and contact ID ("CONTID") for each contact record (102A and 104B in this example). Further in this example, the routing table indicates a source and destination related to which side initiated the mapping, though as depicted, the resulting mapping enables bidirectional data sharing.

Once mapping 4012 is established, direct communications between applications 102 and 104 (and thereby between users 101 and 103) may be established despite applications 102 and 104 having no inherent data sharing (e.g., social-networking) features, such as the ability to directly message or share data between the applications.

For example, mapping 412 in routing table 410 allows users 101 and 103 to send and receive messages, share documents and changes to document, and share other data, such as contact information, on an ongoing basis i.e., without having to reestablish a new mapping each time one user wants to share data with the other user.

As one example, now when contact information is updated, for example by user 103 in application 104, it may be reflected back to contact record 102A in application 102 without the need for manual entry by user 101. Thus, the capabilities of legacy applications 102 and 104 are greatly increased without the need to redesign the applications to include such data sharing features.

In some examples, routing table 410 is maintained on a device separate from the devices used by users 101 and 103 and hosting applications 102 and 104. In other examples, routing table 410 may be maintained by an electronic device (e.g., a server) hosting one or more of applications 102 and 104, such as when applications 102 and 104 are web-based or client-server based applications. In yet other examples, routing table 410 may be maintained by an electronic device associated with one of users 101 and 103, but providing the functionality for both users. In yet other examples, copies of routing tables may be maintained on multiple electronic devices, such as an electronic device associated with each of user 101 and 103. The approach to where routing table 410 is hosted is flexible so long as each user has the ability to access data in routing table 410.

As described above, if one of the applications (e.g., 102 or 104) does not use contact records, the CONTID field of routing table 410 can be left blank while recording other information, such as APPID and UID.

Figure 5:
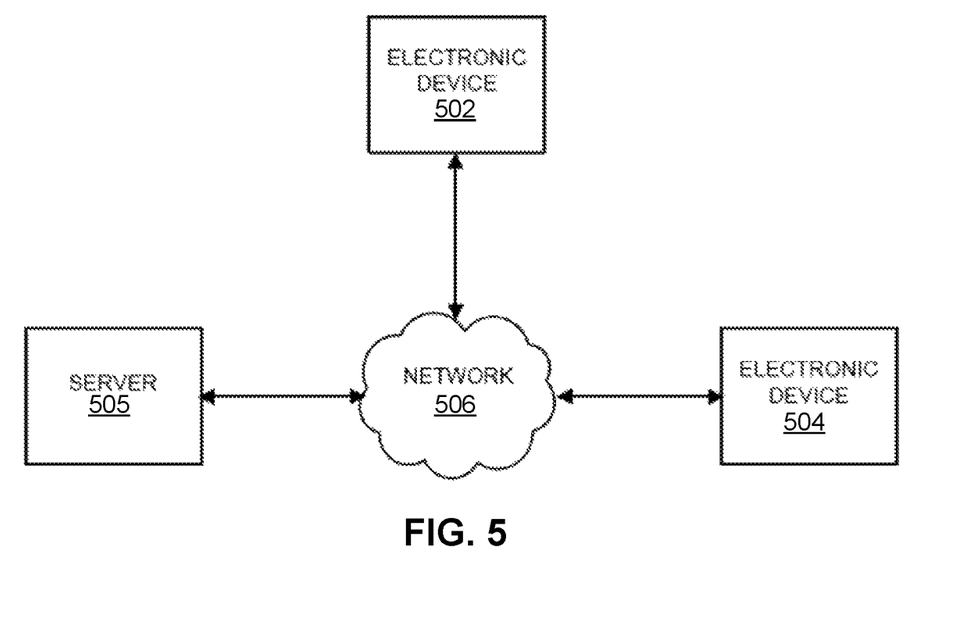
FIG. 5 is a block diagram illustrating an example system configured to perform the methods of FIGS. 1-3.

Example Context for Performing Methods for Establishing a Mapping Between Applications FIG. 5 depicts an example context for performing methods for establishing a mapping between applications, such as described with respect to FIGS. 1-4, above.

For example, electronic device 502 may be used by a first user (such as user 101 in FIGS. 1 and 2) to run a first application (such as application 102 in FIGS. 1 and 2). In some examples, the first application may be a desktop-based or web-based application that does not include social-networking type functions, such as the ability to directly share messages or data between different applications.

Similarly, electronic device 504 may be used by a second user (such as user 103 in FIGS. 1 and 2) to run a second application (such as application 104 in FIGS. 1 and 2). Like the first application, the second application may be a desktop-based or web-based application that does not include social-networking type functions.

Messages and data may be shared between electronic devices 502 and 504 by way of network 506 and server 505, which may be a routing server such as described above with respect to FIGS. 1 and 2. Though, as described above, in other examples, electronic device 502 or 504 (or an application resident thereon) may act as a routing server such that a separate server 505 is not necessary.

When communicating over a network such as network 506, the various communications may all be encrypted to ensure the safety of the shared data and messages.

Example Processing System for Performing Methods for Establishing a Mapping Between Applications FIG. 6 depicts an example processing system 600 that may be configured to perform the sequences described with respect to FIGS. 1 and 2 as well as the method described in FIG. 3.

Processing system 600 includes a CPU 602 connected to a data bus 612. CPU 602 is configured to process computer-executable instructions, e.g., stored in memory 608 or storage 610, and to cause processing system 600 to perform methods as described herein, for example with respect to FIGS. 1-3. CPU 602 is included to be representative of a single CPU, multiple CPUs, a single CPU having multiple processing cores, and other forms of processing architecture capable of executing computer-executable instructions.

Processing system 600 further includes input/output device(s) and interface(s) 604, which allows processing system 600 to interface with input/output devices, such as, for example, keyboards, displays, mouse devices, pen input, and other devices that allow for interaction with processing system 600. Note that while not depicted with independent external I/O devices, processing system 600 may connect with external I/O devices through physical and wireless connections (e.g., an external display device).

Processing system 600 further includes network interface 606, which provides processing system 600 with access to external networks, such as network 506 in FIG. 5, and thereby external computing devices.

Processing system 600 further includes memory 608, which in this example includes receiving module 614, which may perform receiving functions as described above, for example with respect to FIGS. 1-3.

Memory 608 further includes vector transmitting module 616, which may perform transmitting functions as described above, for example with respect to FIGS. 1-3.

Memory 608 further includes identifying module 618, which may perform identifying functions as described above, for example with respect to FIGS. 1-3.

Memory 608 further includes mapping module 620, which may perform mapping functions as described above, for example with respect to FIGS. 1-3.

Memory 608 further includes token generation module 622, which may perform token generation, including token URLs, as described above, for example with respect to FIGS. 1-3.

Memory 608 further includes user application 624. As described above, in some cases the routing and mapping and routing functions may be hosted by a computer running one of the applications to be connected via the mapping. Further, in some cases the application itself performs the mapping and routing functions. Thus, in some examples, application 624 is one of the applications described above with respect to FIGS. 1-3.

Note that while shown as a single memory 608 in FIG. 6 for simplicity, the various aspects stored in memory 608 may be stored in different physical memories, but all accessible CPU 602 via internal data connections, such as bus 612.

Processing system 600 further includes storage 610, which in this example includes routing table 626, which may be like routing table 410 described above with respect to FIG. 4 as well as the routing tables described with respect to FIGS. 1-3.

Storage 610 further includes shared data 628. In implementations where processing system 600 is acting as an intermediary between two other devices (for example as described with respect to FIG. 5), processing system 600 may need to store shared data in transit between two users of two applications. This shared data storage may be temporary and may be protected, such as by encryption.

Storage 610 further includes application data 630, which may relate to application 624.

While not depicted in FIG. 6, other aspects may be included in storage 610.

As with memory 608, a single storage 610 is depicted in FIG. 6 for simplicity, but the various aspects stored in storage 610 may be stored in different physical storages, but all accessible to CPU 602 via internal data connections, such as bus 612, or external connection, such as network interface 606.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of establishing a mapping between users of different applications to enable them to use contact information to initiate data exchange with each other, the method comprising:
   receiving, from a first user of a first application a request to share data with a second user of a second application, wherein the request includes contact information associated with the second user from the first application;
   transmitting a token URL to the second user based on the contact information associated with the second user from the first application;
   identifying the first user to the second application in response to activation of the token URL by the second user;
   receiving, from the second user, contact information associated with the first user from the second application; and
   establishing a mapping in a routing table between the first user of the first application and the second user of the second application based on the first application, the second application, the contact information associated with the second user from the first application, and the contact information associated with the first user from the second application.

2. The method of claim 1, wherein the mapping includes:
   a first user identifier associated with the first user;
   a first identifier associated with the first application;
   the contact information associated with the second user from the first application;
   a second user identifier associated with the second user;
   a second identifier of the second application; and
   the contact information associated with the first user from the second application.

3. The method of claim 1, further comprising: using the mapping in the routing table to enable the first user of the first application to share data with the second user of the second application.

4. The method of claim 1, further comprising:
   receiving, from the first application associated with the first user, data to share with the second user;
   finding the mapping in the routing table between the first user of the first application and the second user of the second application; and
   transmitting the data to share to the second application.

5. The method of claim 4, further comprising:
   receiving, from the second application associated with the second user, modified data to share with the first user;
   finding the mapping in the routing table between the first user of the first application and the second user of the second application; and
   transmitting the modified data to the first application.

6. The method of claim 1, further comprising: generating the token URL after receiving the request, the token URL comprising:
   a URL identifying a remote resource; and
   a token identifying the first user.

7. The method of claim 1, wherein:
   the token URL is transmitted via a communication connection external to the first application and the second application, and
   the communication connection uses one of:
      email; or
      short message service (SMS) message.

8. A processing system, comprising:
   a memory comprising computer-executable instructions;
   a processor configured to execute the computer-executable instructions and cause the processing system to perform a method of establishing a mapping between users of different applications to enable them to use contact information to initiate data exchange with each other, the method comprising:
      receiving, from a first user of a first application a request to share data with a second user of a second application, wherein the request includes contact information associated with the second user from the first application;
      transmitting a token URL to the second user based on the contact information associated with the second user from the first application;
      identifying the first user to the second application in response to activation of the token URL by the second user;
      receiving, from the second user, contact information associated with the first user from the second application; and
      establishing a mapping in a routing table between the first user of the first application and the second user of the second application based on the first application, the second application, the contact information associated with the second user from the first application, and the contact information associated with the first user from the second application.

9. The processing system of claim 8, wherein the mapping includes:
   a first user identifier associated with the first user;
   a first identifier associated with the first application;
   the contact information associated with the second user from the first application;
   a second user identifier associated with the second user;
   a second identifier of the second application; and
   the contact information associated with the first user from the second application.

10. The processing system of claim 8, wherein the method further comprises: using the mapping in the routing table to enable the first user of the first application to share data with the second user of the second application.

11. The processing system of claim 8, wherein the method further comprises:
   receiving, from the first application associated with the first user, data to share with the second user;
   finding the mapping in the routing table between the first user of the first application and the second user of the second application; and
   transmitting the data to share to the second application.

12. The processing system of claim 11, wherein the method further comprises:
   receiving, from the second application associated with the second user, modified data to share with the first user;
   finding the mapping in the routing table between the first user of the first application and the second user of the second application; and
   transmitting the modified data to the first application.

13. The processing system of claim 8, wherein the method further comprises: generating the token URL after receiving the request, the token URL comprising:
   a URL identifying a remote resource; and
   a token identifying the first user.

14. The processing system of claim 8, wherein:
   the token URL is transmitted via a communication connection external to the first application and the second application, and
   the communication connection uses one of:
      email; or
      short message service (SMS) message.

15. A non-transitory computer-readable storage medium comprising instructions that, when executed by a processor of a computer system, cause the computer system to perform a method of establishing a mapping between users of different applications to enable them to use contact information to initiate data exchange with each other, the method comprising:
   receiving, from a first user of a first application a request to share data with a second user of a second application, wherein the request includes contact information associated with the second user from the first application;
   transmitting a token URL to the second user based on the contact information associated with the second user from the first application;
   identifying the first user to the second application in response to activation of the token URL by the second user;
   receiving, from the second user, contact information associated with the first user from the second application; and
   establishing a mapping in a routing table between the first user of the first application and the second user of the second application based on the first application, the second application, the contact information associated with the second user from the first application, and the contact information associated with the first user from the second application.

16. The non-transitory computer-readable storage medium of claim 15, wherein the mapping includes:
   a first user identifier associated with the first user;
   a first identifier associated with the first application;
   the contact information associated with the second user from the first application;
   a second user identifier associated with the second user;
   a second identifier of the second application; and
   the contact information associated with the first user from the second application.

17. The non-transitory computer-readable storage medium of claim 15, wherein the method further comprises: using the mapping in the routing table to enable the first user of the first application to share data with the second user of the second application.

18. The non-transitory computer-readable storage medium of claim 15, wherein the method further comprises:
   receiving, from the first application associated with the first user, data to share with the second user;
   finding the mapping in the routing table between the first user of the first application and the second user of the second application; and
   transmitting the data to share to the second application.

19. The non-transitory computer-readable storage medium of claim 18, wherein the method further comprises:
   receiving, from the second application associated with the second user, modified data to share with the first user;
   finding the mapping in the routing table between the first user of the first application and the second user of the second application; and
   transmitting the modified data to the first application.

20. The non-transitory computer-readable storage medium of claim 15, wherein the method further comprises: generating the token URL after receiving the request, the token URL comprising:
   a URL identifying a remote resource; and
   a token identifying the first user.

* * * * *